Figure 2:
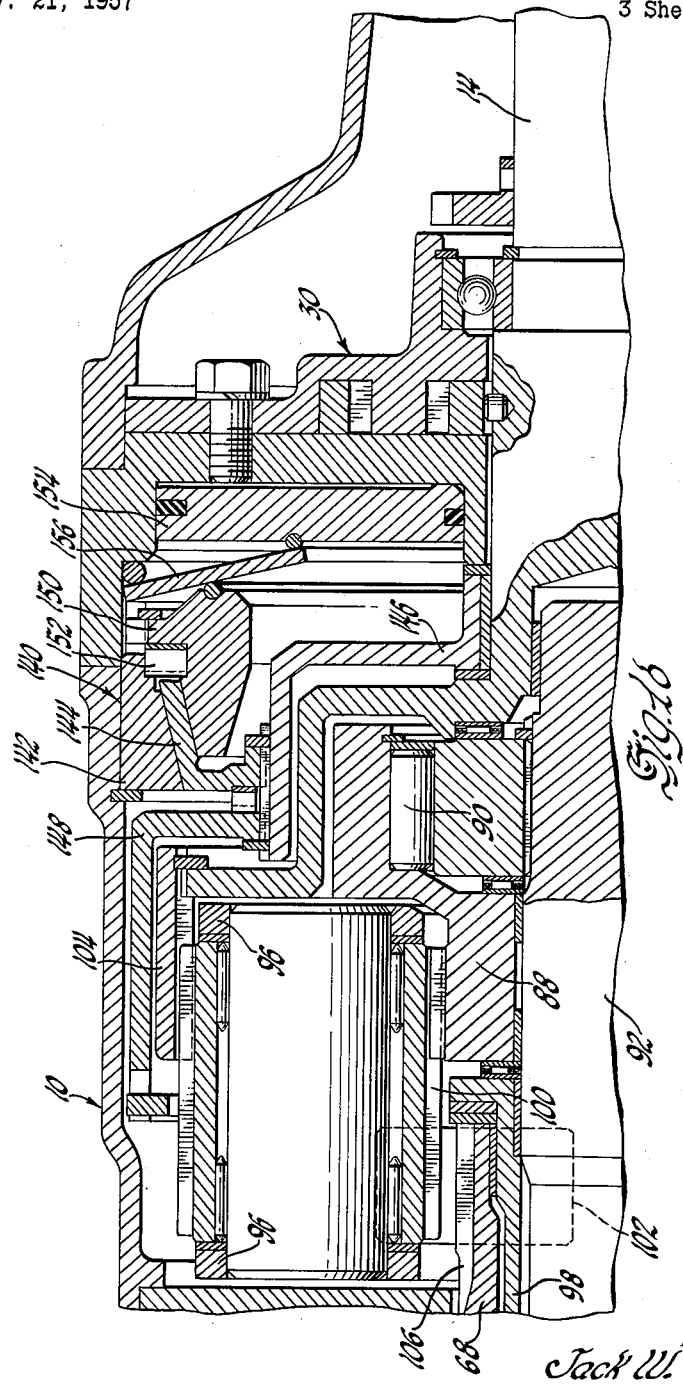

June 13, 1961
J. W. QUALMAN ET AL
2,987,941
TRANSMISSION
Filed Nov. 21, 1957
3 Sheets-Sheet 1
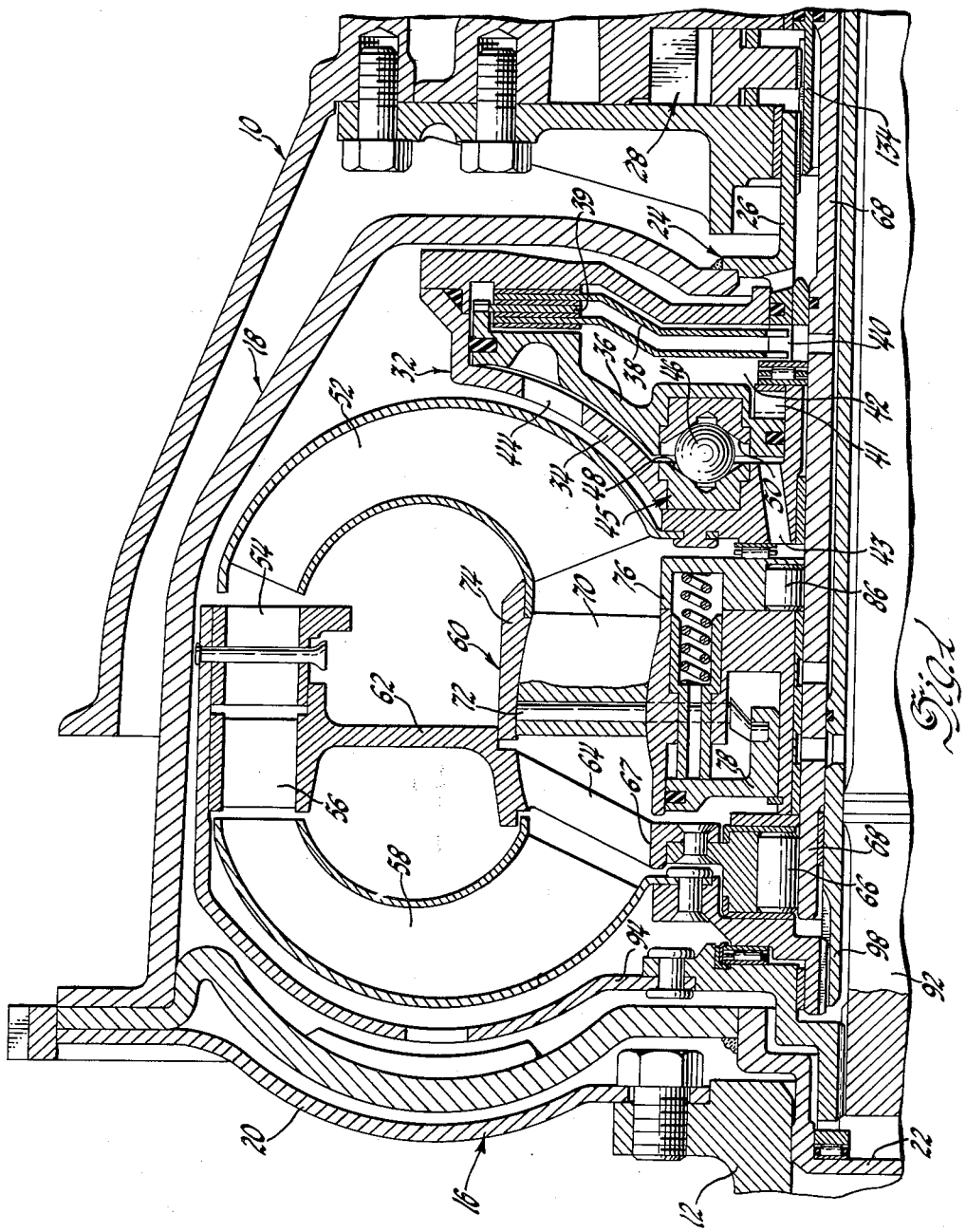
INVENTORS
Jack W. Qualman &
BY Victor C. Moore
W. C. Middleton
ATTORNEY

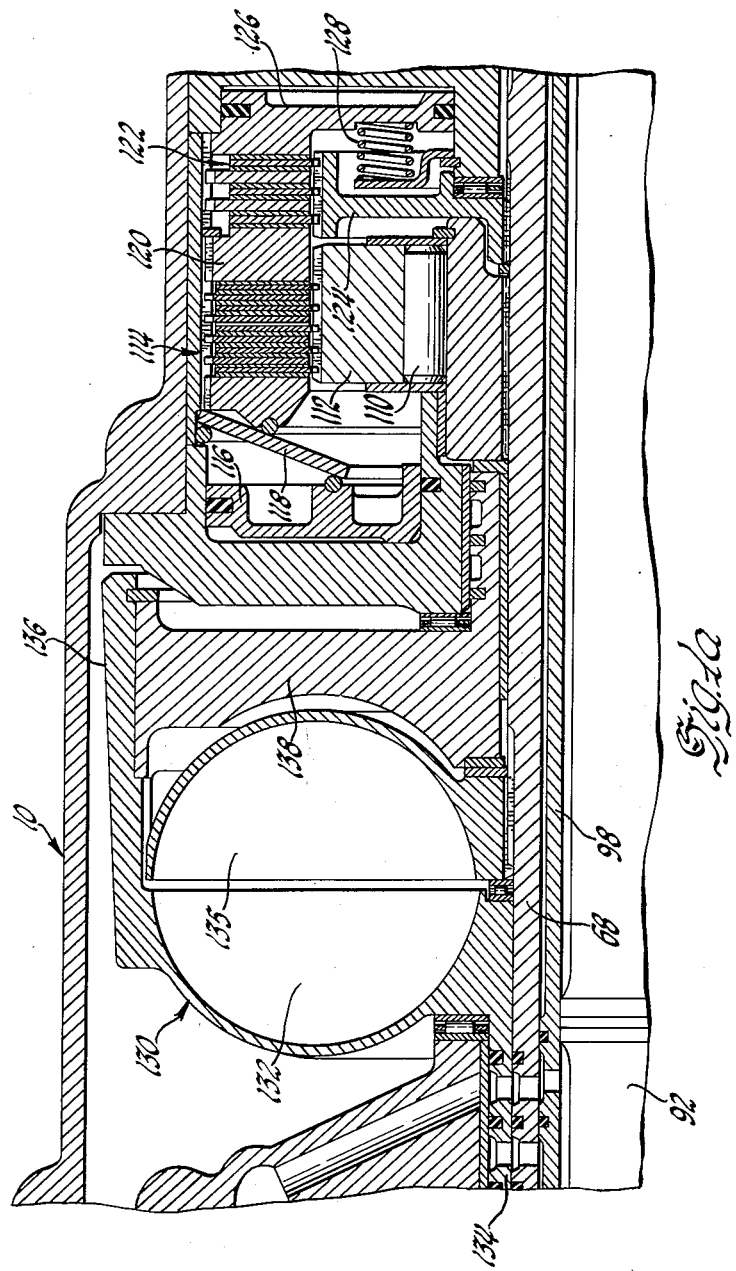

June 13, 1961 J. W. QUALMAN ET AL 2,987,941
TRANSMISSION
Filed Nov. 21, 1957 3 Sheets-Sheet 3

INVENTORS
Jack W. Qualman &
BY Victor C. Moore

W.C. Middleton
ATTORNEY

United States Patent Office

2,987,941
Patented June 13, 1961

2,987,941
TRANSMISSION
Jack W. Qualman, Birmingham, and Victor C. Moore, Plymouth, Mich., assignors to General Motors Corporation, Detroit, Mich., a corporation of Delaware
Filed Nov. 21, 1957, Ser. No. 697,862
12 Claims. (Cl. 74—677)

This invention relates to improvements in the arrangement of hydrodynamic torque transmitting devices and associated gearing for transferring drive at variable ratios between an input and an output. The arrangement is particularly, although not exclusively, suitable for motor vehicle transmissions.

In general, with drives utilizing hydrodynamic torque transmitting devices, e.g., torque converters, torque ratio changes take place smoothly in a relatively imperceptible manner which, of course, is preferred, especially in vehicle transmissions. However, the efficiency of such a device is somewhat less than desired due to inherent fluid losses. To reduce these fluid losses, the torque converter may be locked up in any well known manner or by-passed, either wholly or partially, in the normal range of operation usually occurring in most motor vehicles at speeds above 15 to 20 miles per hour. This then requires a shift or transition to obtain the more efficient range of operation which, with ratio changes occurring smoothly through the one torque converter range of less efficient operation, can be more noticeable than perhaps in a plural shifting transmission. Therefore, the ideal shift should be as much like the ratio changes occurring in the converter as possible.

Accordingly, the invention seeks to provide a transmission which is arranged in a novel way to produce an efficient and smooth variable speed drive. By the invention a hydrodynamic torque transmitting device is combined with gearing so that two phases or ranges of operation are afforded. One of the ranges furnishes a continuously and smoothly varying high torque drive for low speed operation, while the other a lesser torque drive, for instance, a substantially direct drive ratio for higher speeds through the transmission. The shift or transition between the two ranges of operation produced by the proposed arrangement, as sensed by the operator, is somewhat like the changes in ratio through the hydrodynamic device. Specifically, the shift is accomplished through planetary gearing by the combination of a fluid coupling and a one-way reaction device. By filling the coupling to lock up the gearing and commence an upshift, the one-way device releases progressively as the coupling assumes the drive whereas by emptying the coupling for a downshift, the one-way device gradually locks to hold the reaction element of the gearing as the coupling drains.

Another important object of the invention is to reduce fluid losses through the hydrodynamic device for the proposed arrangement by transferring only part of the drive through the device during normal operation with the remaining portion proceeding directly from the input to an element of the gearing.

Also, by the invention, the transmission operating units are advantageously positioned so as to require a minimum radial space for the transmission.

In carrying out the invention, a hydrodynamic torque transmitting device, such as a torque converter, is combined with planetary gearing to transfer drive between drive and driven shafts. The torque converter includes two turbines, one of which drives an input element for the gearing while the other turbine drives another input element of the gearing when the first turbine becomes ineffective. A releasable mechanism prevents rearward rotation of the reaction element for the gearing and, therefore, drive is transferred by the gearing to the driven shaft at continuously varying ratios. At a particular speed, another hydrodynamic torque transmitting device, for instance, a fluid coupling, interconnected between the drive shaft and the reaction element of the gearing, is filled with fluid whereupon the reaction element is driven forwardly. As a consequence, part of the drive from the drive shaft proceeds directly to the gearing and another portion goes through the torque converter and then to the gearing affording a split torque drive for a more efficient range of normal driving operation.

The transmission includes a reverse drive as well as provisions for engine braking and a positive neutral.

The foregoing and other objects and advantages of the invention will be apparent from the following description and from the accompanying drawings, in which:

FIGURES 1, 1a, and 1b are sectional views illustrating, respectively, the lefthand, central and righthand portions of a transmission, constructed according to the invention.

Referring to the drawings, the numeral 10 designates a casing for enclosing a transmission arranged to best demonstrate the principles of the invention. Input to the transmission is from a driving shaft 12, which may be the conventional vehicle engine crankshaft, and output is from a driven shaft 14, coaxial with the shaft 12, to the vehicle wheels (not shown). Adjacent to the drive shaft 12 and in the drive train between this shaft and the driven shaft 14 is a hydrodynamic torque transmitting device, such as torque converter 16. The converter 16 is enclosed by a converter housing 18 which is drive connected to the drive shaft 12 by a flexplate 20. The front end of the converter housing 18 has a hub portion 22 located within an opening in the end of the drive shaft 12 to provide support therefor while the rear end of the converter housing 18 has a sleeve portion 24 that includes a rearward extension 26 rotatably supported in the casing 10.

Fluid for operating the torque converter 16 and the various hydraulically actuated units and suitable controls therefor (not shown) is provided by a front pump 28 driven at the speed of the drive shaft 12, as will be apparent, and a rear pump 30 driven at the speed of the driven shaft 14. These pumps 28 and 30 may be of known construction utilizing vanes, gears, or the like.

Drive between the torque converter 16 and the converter housing 18 is transferred by a neutral clutch, denoted generally at 32. This clutch 32 has a clutch housing 34 in which is slidably supported a neutral clutch piston 36. A pair of driving clutch plates 38 with a driven clutch plate 39 interposed therebetween and attached to the piston 36 are positioned between the piston 36 and a wall of the clutch housing 34. The driving clutch plates 38 at the inner ends thereof have teeth formed thereon which intermesh with like teeth formed on a forward extension 40 of the sleeve portion 24. A clutch disengaging spring 41 and fluid pressure in a chamber 42, when provided, maintain the piston 36 in the clutch disengaged position depicted. Preferably, fluid pressure for engaging the clutch 32 is obtained from the torque converter 16 inasmuch as an initial charging pressure is supplied thereto that can proceed through openings 43 and 44 in the clutch housing 34 and engage the clutch 32 when fluid pressure in chamber 42 is relieved. Since this converter charging pressure is always available, being in the vicinity of the neutral clutch 32, the advantage is apparent, although conditions may necessitate a different pressure source.

A torque-assist mechanism, shown generally at 45, is installed between the clutch housing 34 and the piston 36 for a purpose to be explained. The mechanism includes a series of balls 46, each of which is received by circumferentially spaced pockets 48 and 50 in the housing 34 and piston 36, respectively. These pockets are provided with ramps that, when engagement of the clutch 32 is commenced by a fluid apply pressure, due to the wedging action between the ramps of the balls will provide additional engaging force. The wedging action is produced by the difference in speeds of rotation of the driving clutch plates 38 and the neutral clutch piston 36 existing just before engagement has started. As soon as engagement has commenced, a twist occurs, although slight, sufficient to cause the balls 46 to be urged along the ramps of the pockets 48 and 50, thus supplementing fluid pressure and forcing the piston 36 axially to the engaging position. Not only does this mechanism provide additional engaging pressure but the engagement is also more positive and less perceptible with resultant greater clutch plate life.

When the neutral clutch 32 is engaged, an impeller 52 connected to the neutral clutch housing 34 is driven thereby and commences operation of the torque converter 16. Disposed in consecutive order and defining a working circuit around which flow traverses a counterclockwise path, as viewed in FIGURE 1, between the impeller entrance and exit, are a first turbine 54, an outer first stator 56, a second turbine 58, and an inner variable second stator 60. Each component of the converter has blades of suitable configuration for most effective operation of the converter 16. The outer stator 56 has a depending annular wall 62 crossing the flow path of the converter at which point a series of appropriately shaped spokes 64 are formed to offer the least resistance to flow between the second turbine 58 and the inner stator 60. The outer stator 56 is prevented from reverse rotation by a one-way device 66 interposed between the hub 67 of the stator 56 and a reaction shaft 68. Shaft 68 is prevented from reverse rotation and furnishes a ground connection as will be explained. The one-way device 66 and the others employed in this transmission may be the conventional type utilizing one-way elements such as sprags or rollers arranged to prevent rotation between the associated members in one direction and to allow free relative rotation in the opposite direction.

In order that the torque multiplication of the converter 16 may be varied externally, the inner stator 60 is rendered infinitely variable between certain extreme positions in any appropriate way, such as disclosed in the Kelley application S.N. 671,190, filed July 11, 1957 and now Patent No. 2,911,786, entitled "Transmission." Briefly, a plurality of blades 70 are secured to crankpins 72 and are movably mounted between an outer shroud 74 and an inner annular cylinder 76. Slidably positioned within the cylinder 76 is a piston 78 that is connected to the crank end of the pins 72. This latter connection is arranged so that axial movement of the piston 78 will, through the crankpins 72, rotate the movable blades 70 relative to the converter working circuit. The position of the piston 78 is preferably determined by the difference in the pressure within the torque converter 16, which latter pressure tends to move the piston 78 to the right, and an opposing pressure which is influenced by the vehicle load. Accordingly, with a maximum vehicle load the piston 78 will be moved to the right rotating the blades 70 to the high angle or maximum torque multiplication position and with a minimum load the blades 70 will be rotated to the minimum angle position. Reverse rotation of the stator 60 is prevented by a one-way device 86 interposed between the reaction shaft 68 and the annular cylinder 76.

In the rear of the transmission, planetary gearing is located, which, with the torque converter 16, contributes to the overall torque multiplication of the transmission. The gearing has an input sun gear 88 journaled on and connected by a one-way device 90 to the rear end of an inner shaft 92. The front end of this shaft 92 is splined to the hub of an arcuate drive flange 94, in turn, connected to the first turbine 54. A planet carrier 96 for the gearing is connected to the rear end of an intermediate sleeve shaft 98 surrounding shaft 92 while the front end of the shaft 98 is splined to the hub of the second turbine 58. Journaled on the carrier 96 are a first set of the elongated planet pinions 100 and a second set of shorter planet pinions 102. The elongated pinions 100 intermesh with the input sun gear 88 and an output ring gear 104, the gear 104 being connected to the driven shaft 14. The shorter planet pinions 102 intermesh with the elongated pinions 100 and a reaction sun gear 106 formed integral with the rear end of the reaction shaft 68.

Reverse rotation of the reaction shaft 68 is prevented by a one-way device 110, an outer race 112 of which is fixed relative to the transmission casing 10 by a disk-type reaction brake, shown generally at 114. When reaction brake 114 is engaged, the outer race 112 cannot rotate in either direction while the one-way device 110 will lock to prevent reverse rotation of the reaction shaft 68 and overrun when the reaction shaft 68 is driven forwardly. The brake 114 is operated by a hydraulically actuated piston 116, housed within the casing 10, which will shift to the right when fluid pressure is applied and, through a Belleville spring 118, will compress the disks of the brake 114 into frictional engagement against a backing member 120. The Belleville spring 118 is of the well known kind and arranged to return the piston 116 to the disengaged position illustrated when the pressure acting on the piston 116 is relieved. As will be noted the Belleville spring 118 functions like a lever with the leverage selected so that a minimum fluid pressure is required for a full engagement of reaction brake 114.

At times, for instance, when the vehicle is descending a steep hill, it is desirable to have engine braking available. As mentioned, the one-way device 110 will allow the reaction shaft 68 to rotate forwardly which condition would exist if the driven shaft 14 were driving the gearing. Consequently, the gearing is ineffective with the reaction sun gear 106 revolving forward freely and then the engine cannot offer any resistance with the connection thereto interrupted. To provide this engine braking an overrun brake 122 is included adjacent to and rearwardly of reaction brake 114. The overrun brake 122 is also of the disk type and includes a hub 124 splined to the reaction shaft 68. When the piston 126 is actuated by pressure fluid, the disks of the brake 122 are compressed into frictional engagement against the backing member 120. As a result the hub 124 and reaction shaft 68 will be prevented from rotation in either direction relative to the casing 10. A series of springs 128 are provided to disengage the brake 122 when pressure fluid is relieved.

Normally, engine braking is essential only at lower vehicle speeds during which time the reaction brake 114 will be engaged. Hence, the backing member 120 can be used for both the brakes 114 and 122 since the pressure or force from the piston 116 will be greater than that from the piston 126. By using a single backing member for both brakes obviously fewer parts are required.

Between the torque converter 16 and the brakes 114 and 122, as seen in FIGURE 1a, another hydrodynamic torque transmitting device, as fluid coupling 130, is disposed to afford a split torque drive above certain vehicle speeds, e. g., from 15 to 20 miles per hour. The coupling 130 has a pump element 132 with a forwardly extending sleeve 134 splined to rearward extension 26 of the converter housing sleeve portion 24 and, therefore, the pump element 132 is directly connected by the converter housing 18 and flexplate 20 to the drive shaft 12. A turbine element 135 of the coupling 130 is attached to the reaction shaft 68. Affixed to a rearwardly extending flange 136 of the pump member 132 is a cover 138, the purpose of which is to afford a fluid tight enclosure for coupling 130. When the coupling 130 is filled with fluid, the reaction shaft 68 will be driven forwardly by the drive shaft 12, forward rotation being permitted by the one-way device 110, and the overrun brake 122 will, of course, be disengaged.

Reverse drive for the transmission is accomplished by the engagement of the reverse brake 140. The reverse brake 140, which is of the cone type, includes a stationary cone member 142 secured to the transmission casing 10, an intermediate cone member 144 spline-connected by a transfer element 146 to a planet carrier joined drum 148, and an actuating cone member 150. A wave-type spring 152 is positioned between the stationary cone member 142 and the actuating cone member 150 to assist in moving the actuating cone member 150 to the disengaged position. The brake 140 is engaged by hydraulically actuated piston 154 which, through the agency of a Belleville type spring 156, similar in operation to the spring 118 for reaction brake 114, urges the actuating cone member 150 to the engaged position so that the mating cone surfaces of members 142, 144 and 150 are in frictional engagement. When the brake 140 is engaged, transfer element 146, drum 148, and the planet carrier 96 are all held stationary. With the carrier 96 held, shaft 98, and, therefore, second turbine 58, will also be maintained stationary whereupon the drive to the gearing is from the first turbine 54 in a forward direction through the inner shaft 92 and one-way device 90 to the input sun gear 88. The elongated pinions 100 will be rotated backwards and this backwards rotation will be transferred at a reduced speed to the output ring gear 104 and the driven shaft 14, thus establishing a reverse drive.

In operation with the neutral clutch 32 disengaged and the fluid coupling 130 empty, drive cannot be transferred to the torque converter 16, nor by the fluid coupling 130 to the reaction sun gear 106, and therefore, the transmission is in neutral. When forward drive is wanted, the neutral clutch 32 is engaged as is brake 114, whereupon the impeller 52 for the converter 16 will start to pump fluid around the converter working circuit. The fluid leaving the exit of the impeller 52 will have a forward component and start to drive the first turbine 54 forward. This drive is then transmitted by inner shaft 92 through the one-way device 90 to the input sun gear 88. Also, the fluid leaving the first turbine will have a rearward component tending to urge the first stator 56 backwards which, as mentioned, is prevented by the one-way device 66 and the reaction shaft 68, the reaction shaft 68 being held against reverse rotation by the one-way device 110 and the reaction brake 114. Fluid leaving the outer stator 72 will have a forward component and, as a result, drive the second turbine 58 forwardly. The variable stator blades 70 will be, generally, set at an angle that furnishes maximum assistance to impeller 52 by changing the component of the fluid force at the exit of the second turbine to a forward component thereby producing the greatest torque multiplication.

Initially, the second turbine at low speeds will produce very little drive, and therefore, the first turbine 54 will be primary source of torque. With the reaction sun gear 106 prevented from reverse rotation, the forwardly driven sun gear 88 will, as a result, cause the output ring gear 104 to be driven forwardly at a reduced speed and, accordingly, the driven shaft 14. As the speed of the impeller 52 increases, the drive from the first turbine 54 will decrease and the second turbine 58 will take over. At some predetermined point, the fluid leaving the first turbine 54 will assume a forward component, and therefore, the outer stator 56 will be driven forwardly and attain the coupling point. With the second turbine 58 assuming the drive, the intermediate sleeve shaft 98 and the planet carrier 96 will be driven forwardly causing the output ring gear 104 and the driven shaft 14 to be rotated forwardly at a greater speed. When the second turbine 58 assumes the major portion of the drive, the input sun gear 88 will rotate faster than the inner shaft 92, this being permitted by the one-way device 90. Then, with the variable stator blades 70 in the minimum position, the converter 16 will be in the coupling stage with all of the members rotating forwardly at substantially the same speed. The foregoing will be referred to as the torque converter drive range of operation.

To lessen the fluid losses through the torque converter 16, a shift is provided from the torque converter drive range to a split torque drive range. This is accomplished by filling fluid coupling 130. As the coupling 130 is filled with fluid, the reaction shaft 68 will be rotated slowly forwardly, the speed increasing as the capacity of the coupling increases. Since the one-way device 110 gradually releases as the coupling starts to revolve the reaction shaft 68, a smooth and imperceptible shift or transition from the one range to the other is produced. When the coupling 130 is full, the reaction sun gear 106 will be driven at substantially the same speed as the drive shaft 12, the only difference being due to the inherent slippage through the coupling 130. Meanwhile, the second turbine 58 will be driving the planet carrier 96 at substantially the same speed as the drive shaft 12 with a slight difference due to slippage and fluid losses in the converter 16. Consequently, as is known, with two elements of a planetary gear set driven at nearly the same speed, in this instance, the reaction sun gear 106 and carrier 96, the gear set may be considered locked up for what approximates a direct drive and the output ring gear 104 and the driven shaft 14 will be driven at approximately the same speed as the drive shaft 12. The split torque aspect is important since part of the drive is through the fluid coupling 130 to the reaction sun gear 106, the slippage losses being less than through the torque converter 16, and the remainder of the drive is through the torque converter 16 to the gearing.

To establish reverse drive, as previously mentioned, the reverse brake 140 is engaged holding the planet carrier 96 against rotation in either direction. Also, the fluid coupling 130 is emptied and the brakes 114 and 122 are disengaged. Since the carrier 96 is held, the second turbine 58 will also be fixed and drive will be from the first turbine 54 to the gearing from where it will proceed at a reduced speed to the driven shaft 14 in a reverse direction.

The overrun brake 122, as mentioned, has been provided to hold the sun gear 106 when engine braking is desired. Preferably, a braking range of operation is offered which is separate from the two ranges of forward drive, namely, the torque converter and the split torque drive ranges. In the braking range, the transmission will be conditioned the same as in torque converter drive range except that the overrun brake will be engaged. Because of the similarity of the transmission status in both the braking and torque converter ranges these two ranges may be combined with the overrun brake 122 engaged, if desired, however, brake 122 will have to be disengaged before the fluid coupling 130 is filled to initiate an upshift to the split torque drive range.

From the foregoing it can be seen that a versatile torque converter including an infinitely variable stator is included in the arrangement and combined with gearing to provide two ranges of operation. The normal driving range furnishes a split torque drive thereby offering a more efficient transmission, while in the torque converter range, considerable torque multiplication can be obtained. Further, the units of the transmission are positioned so that a minmum number of parts are required and also so that the radial space required for the transmission reduced decreasing the size of the hump required in the floorboard of the vehicle.

The invention is to be limited only by the following claims.

We claim:

1. In a transmission, the combination of driving and driven members, a hydrodynamic torque transmitting device including an impeller, a plurality of turbines, and a plurality of stators arranged between the turbines and the impeller, means clutching the impeller to the driving member, planetary gearing comprising a planet carrier element having a pair of intermeshing planet pinions journaled thereon, a plurality of gear elements meshing with the planet pinions, two of the planetary gearing elements being each drive connected to different ones of the plurality of turbines, another of the planetary gearing elements functioning as a reaction element, and still another of the planetary gearing elements performing as an output for the planetary gearing, a plurality of ratio establishing devices, one of the ratio establishing devices preventing rotation of the reaction element in one direction to provide one forward drive range through the transmission, another of the ratio establishing devices being operable to drive connect the driving member and the reaction element to afford another forward drive range through the transmission and still another of the ratio establishing devices preventing rotation of one of the planetary gearing input elements to furnish a reverse drive through the transmission.

2. In a transmission, the combination of driving and driven members, a hydrodynamic torque transmitting device including an impeller and a plurality of turbines, a first clutch for connecting the impeller to the driving member, planetary gearing comprising an input gear driven by one of the turbines, a planet carrier driven by another of the turbines, a first planet pinion journaled on the carrier and meshing with the input gear, a second planet pinion journaled on the carrier and meshing with the first planet pinion, a reaction gear in mesh with the second planet pinion, and an output gear for the planetary gearing meshing with the first planet pinion; a brake for preventing rotation of the reaction gear in one direction to afford one drive range through the transmission, a second clutch for drive connecting the driving member and the reaction gear to afford another drive range through the transmission.

3. In a transmission, the combination of a hydrodynamic torque transmitting device including an impeller, a plurality of turbines, and a plurality of stators arranged between the turbines and the impeller; means clutching the impeller to a power source, planetary gearing comprising an input gear driven by one of the turbines, a planet carrier driven by another of the turbines, a first planet pinion journaled on the carrier and meshing with the input gear, a second planet pinion journaled on the carrier and meshing with the first planet pinion, a reaction gear in mesh with the second planet pinion, and an output gear for the planetary gearing meshing with the first planet pinion; a fluid coupling having a pump driven with the impeller of the hydrodynamic torque transmitting device and a turbine drive connected to the reaction gear for the planetary gearing, the coupling when filled with fluid transmitting torque to rotate the reaction gear at substantially the same speed as the impeller and afford one drive range through the transmission, and means for preventing rotation of the reaction gear in one direction when the coupling is empty to provide a different drive range through the transmission.

4. In a transmission, the combination of a driving shaft; a driven shaft; a hydrodynamic torque transmitting device including an impeller, a first turbine receiving fluid from the impeller, and a second turbine receiving fluid from the first turbine; means clutching the impeller to the driving shaft; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear in mesh with the second planet pinion, and a ring gear drive connected to the driven shaft and meshing with the first planet pinion; means operable to prevent rotation of the reaction sun gear in one direction to provide one drive range through the transmission; and means for operatively connecting the reaction sun gear to the driving shaft to provide another drive range through the transmission with part of the drive being transferred by the driving shaft directly to the planetary gearing and another part of the drive being transferred through the hydrodynamic torque transmitting device to the planetary gearing.

5. In a transmission; the combination of a driving shaft; a driven shaft; a hydrodynamic torque transmitting device including an impeller driven by the driving shaft, first and second turbines, a first stator interposed between the impeller and the first turbine and a second stator interposed between the second turbine and the impeller; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear in mesh with the second planet pinion, and a ring gear drive connected to the driven shaft and meshing with the first planet pinion; a brake for preventing rotation of the reaction sun gear in one direction to provide one drive range through the transmission; and a clutch for operatively connecting the reaction sun gear to the driving shaft to provide a split torque drive range through the transmission.

6. In a transmission; the combination of a driving shaft; a driven shaft; a hydrodynamic torque transmitting device including an impeller, first and second turbines, a first stator interposed between the impeller and the first turbine, and a second stator interposed between the second turbine and the impeller; a clutch drive connecting the impeller and the driving shaft; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear in mesh with the second planet pinion, and a ring gear drive connected to the driven shaft and meshing with the first planet pinion; a fluid coupling having a pump driven by the driving shaft and a turbine connected to the reaction sun gear; the coupling when filled with fluid transmitting torque to rotate the reaction sun gear at substantially the same speed as the driving shaft and afford a split torque drive range through the transmission; and a one-way brake for preventing rotation of the reaction sun gear in one direction when the coupling is empty to afford another drive range through the transmission.

7. In a transmission; the combination of a driving shaft; a driven shaft; a torque converter including an impeller connected to the driving shaft, first and second turbines, and a stator interposed between the second turbine and the impeller, the impeller, turbines, and stator together defining a torque transmitting fluid circuit proceeding from the impeller through the first and second turbines, the stator and back to the impeller; means for adjusting the position of the stator blades to vary the torque output of the converter; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear in mesh with the second planet pinion, and a ring gear drive connected to the driven shaft and meshing with the first planet pinion; a fluid coupling having a pump driven by the driving shaft and a turbine connected to the reaction sun gear; the coupling when filled with fluid transmitting torque to rotate the reaction sun gear at substantially the same speed as the driving shaft to provide a split torque drive range through the transmission; and a one-way brake for preventing rotation of the reaction sun gear in one direction when the coupling is empty to provide a different drive range through the transmission.

8. In a transmission; the combination of a driving shaft; a driven shaft; a torque converter including an impeller connected to the driving shaft, first and second turbines, and a stator interposed between the second turbine and the impeller and having movable blades, the impeller, turbines, and stator together defining a torque transmitting fluid circuit proceeding through the impeller through the second and first turbines, the stator and back to the impeller; means for adjusting the position of the stator blades to vary the torque output of the converter; a reaction shaft; releasable means for preventing rotation of the reaction shaft in one direction; overrunning means between the reaction shaft and the stator for preventing backward rotation thereof; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear connected to the reaction shaft and meshing with the second planet pinion, and a ring gear drive connected to the driven shaft and meshing with the first planet pinion; a fluid coupling having a pump driven by the driving shaft and a turbine connected to the reaction shaft; the coupling when filled with fluid transmitting torque to rotate the reaction sun gear at substantially the same speed as the driving shaft to provide a split torque drive range through the transmission; a different drive range being provided when the coupling is empty and the reaction sun gear is prevented from rotation by the releasable means.

9. In a transmission; the combination of a driving shaft; a driven shaft; a torque converter including an impeller drive connected to the driving shaft, first and second turbines, a stator interposed between the second turbine and the impeller and including movable blades, the impeller, turbines, and stator together defining a torque transmitting fluid circuit proceeding from the impeller through the first and second turbines, the stator and back to the impeller; means for adjusting the position of the stator blades to vary the torque output of the converter; a reaction shaft; a brake for preventing rotation of the reaction shaft in one direction; a one-way clutch between the reaction shaft and the stator for preventing backward rotation thereof; planetary gearing including an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear drive connected to the reaction shaft and meshing with the second planet pinion, and a ring gear drive connected to the driven shaft and meshing with the first planet pinions; a one-way clutch between the first turbine and the input sun gear for allowing the sun gear to overrun relative to the first turbine with the second turbine driving; a fluid coupling having a pump driven by the driving shaft and a turbine connected to the reaction shaft; the coupling when filled with fluid transmitting torque to rotate the reaction sun gear at substantially the same speed as the driving shaft to afford one drive range through the transmission, a different drive range being provided when the coupling is empty and the reaction sun gear is held against rotation by the brake.

10. In a transmission; the combination of a driving shaft; a driven shaft; a torque converter including an impeller drive connected to the driving shaft, first and second turbines, a stator interposed between the second turbine and the impeller and including movable blades; the impeller, turbines, and stator together defining a torque transmitting fluid circuit proceeding from the impeller through the first and second turbines, the stator and back to the impeller; means for adjusting the position of the stator blades to vary the torque output of the converter; a reaction shaft; a brake for preventing rotation of the reaction shaft in one direction; a one-way clutch between the reaction shaft and the stator for preventing backward rotation thereof; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear drive connected to the reaction shaft and meshing with the second planet pinion, and a ring gear drive connected to the driven shaft and meshing with the first planet pinion; a one-way clutch between the first turbine and the input sun gear for allowing the sun gear to overrun relative to the first turbine with the second turbine driving; a fluid coupling having a pump driven by the driving shaft and a turbine connected to the reaction shaft; the coupling when filled with fluid transmitting torque to rotate the reaction sun gear at substantially the same speed as the driving shaft to afford one drive range through the transmission, a different drive range being provided when the coupling is empty and the reaction sun gear is held by the brake; and a brake for preventing rotation of the reaction shaft in either direction to provide engine braking.

11. In a transmission; the combination of a driving shaft; a driven shaft; a torque converter including an impeller, first and second juxtaposed turbines, a first stator interposed between the impeller and the first turbine, a second stator interposed between the second turbine and the impeller and having movable blades, the impeller, turbines and stators together defining a torque transmitting fluid circuit proceeding from the impeller through the first stator, the first and second turbines, the second stator and back to the impeller; means for adjusting the position of the stator blades to vary the torque output of the converter; a reaction shaft; a releasable means for preventing rotation of the reaction shaft in one direction; overrunning means between the reaction shaft and the first and second stators for preventing backward rotation thereof; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear connected to the reaction shaft and meshing with the second planet pinion, and a ring gear drive connected to the driven shaft and meshing with the first planet pinion; a fluid coupling having a pump driven by the driving shaft and a turbine connected to the reaction shaft; the coupling when filled with fluid transmitting torque to rotate the reaction sun gear at substantially the same speed as the driving shaft and providing a split torque drive range through the transmission; a different drive range being provided when the coupling is empty and the reaction sun gear is held by the releasable means.

12. In a transmission; the combination of a driving shaft; a driven shaft; a torque converter including an impeller drive connected to the driving shaft, first and second turbines, a stator interposed between the second turbine and the impeller and including movable blades; the impeller, turbines, and stator together defining a torque transmitting fluid circuit proceeding from the impeller through the first and second turbines, the stator and back to the impeller; means for adjusting the position of the stator blades to vary the torque output of the converter; a reaction shaft; a brake for preventing rotation of the reaction shaft in one direction; a one-way clutch between the reaction shaft and the stator for preventing backward rotation thereof; planetary gearing comprising an input sun gear driven by the first turbine, a planet carrier driven by the second turbine, a first planet pinion journaled on the carrier and meshing with the input sun gear, a second planet pinion journaled on the carrier and meshing with the first planet pinion, a reaction sun gear drive connected to the reaction shaft and meshing with the second planet pinion, and a ring gear drive connected to the driven shaft and meshing with the first planet pinion; a one-way clutch between the first turbine and the input sun gear for allowing the sun gear to overrun relative to the first turbine with the second turbine driving; a fluid coupling having a pump driven by the driving shaft and a turbine connected to the reaction shaft, the coupling when filled with fluid transmitting torque to rotate the reaction sun gear at substantially the same speed as the driving shaft to afford one drive range through the transmission, a different drive ratio being provided when the coupling is empty and the reaction sun gear is held by the brake; and a clutch between the driving shaft and the impeller of the torque converter disengageable to interrupt drive through the transmission.

References Cited in the file of this patent
UNITED STATES PATENTS

| | | |
|---|---|---|
| 2,350,810 | Pentz | June 6, 1944 |
| 2,687,657 | Kugel et al. | Aug. 31, 1954 |
| 2,695,533 | Pollard | Nov. 30, 1954 |
| 2,737,828 | Seybold | Mar. 13, 1956 |
| 2,803,974 | Kelley | Aug. 27, 1957 |
| 2,873,618 | De Lorean | Feb. 17, 1959 |